Jan. 29, 1952 J. J. NEFF 2,583,791
ELECTRONIC COMPARATOR
Filed Sept. 27, 1945 2 SHEETS—SHEET 2
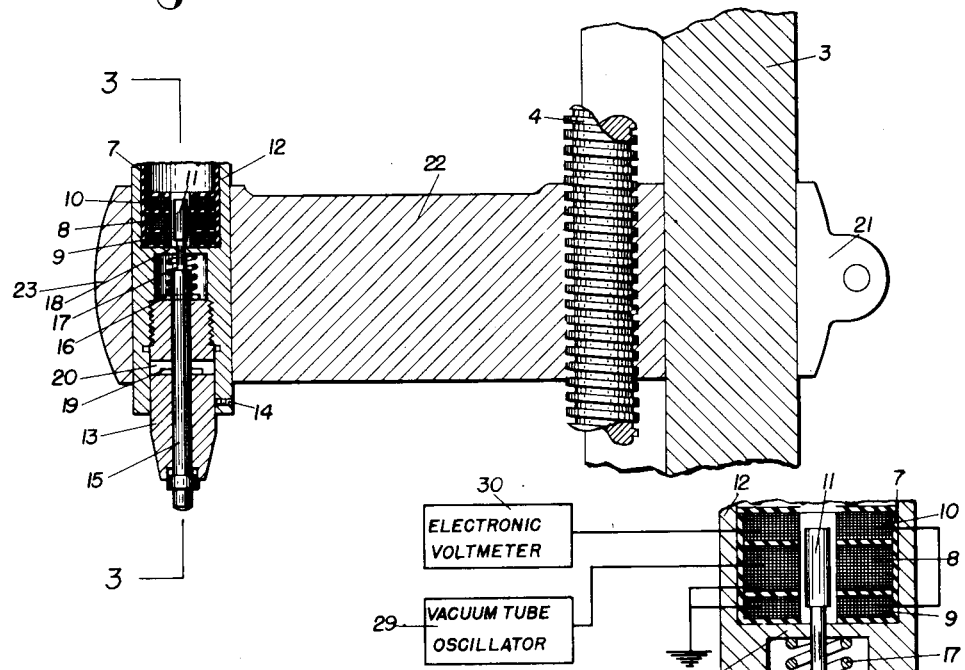
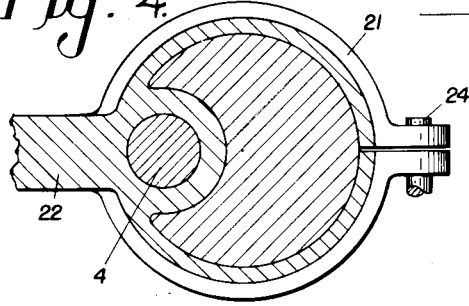
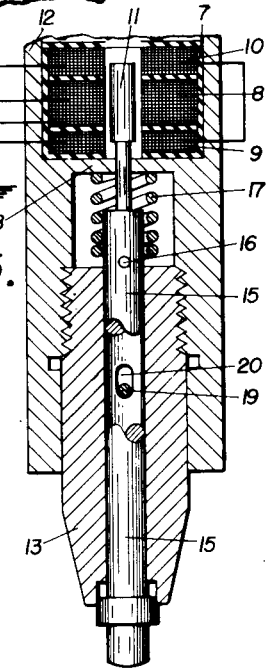
Inventor
JOSEPH J. NEFF
By
Frank A. Harmon
ATTORNEY Patented Jan. 29, 1952

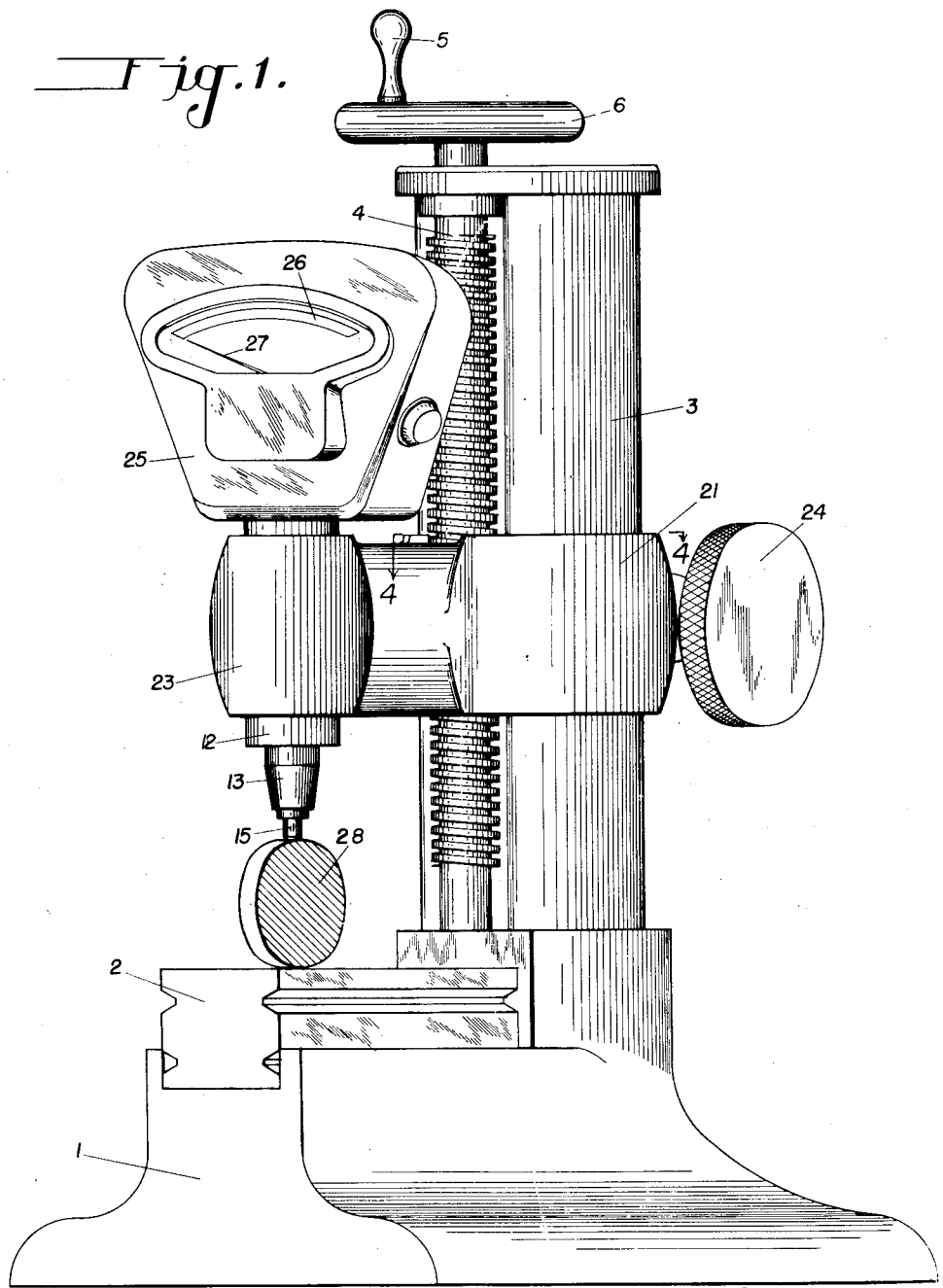

2,583,791

UNITED STATES PATENT OFFICE 2,583,791

ELECTRONIC COMPARATOR

Joseph J. Neff, South Euclid, Ohio, assignor, by mesne assignments, to Jack & Heintz Precision Industries, Inc., Cleveland, Ohio, a corporation of Delaware Application September 27, 1945, Serial No. 618,847

2 Claims. (Cl. 33—147)

1

This invention relates to precision measuring instruments and has for one of its primary objects to provide a self-contained electronic gauge to comprise a work support and a standard upon which is adjustably mounted an instrument dial and an electrical displacement pickup unit whose armature carries a spring pressed stylus to engage the work as it rests on its support to determine by the scale reading the outside diameter of the work or the variance thereof from a given standard.

With the foregoing and other objects in view the invention resides in the combination of parts and in the details of construction hereinafter set forth in the following specification and appended claims, certain embodiments thereof being illustrated in the accompanying drawings in which:

Figure 1 is a view in elevation of the gauge assembly and the work being supported and measured by the gauge;

Figure 2 is a partial enlarged view in vertical section taken through the displacement pickup unit and adjustable support therefor;

Figure 3 is an enlarged view in section taken along line 3—3 of Figure 2, showing the displacement pickup, the vacuum tube oscillator and electronic voltmeter and leads and wiring diagram being shown schematically; and Figure 4 is a view in section taken along line 4—4 of Figure 1.

Referring more particularly to the drawings, the device includes a base 1 in which a work supporting table 2 is suitably mounted and a standard 3 in which is rotatably mounted a spiral screw threaded rod 4 which may be rotated by a hand lug 5 on a wheel 6.

The displacement pickup is similar in nature to that disclosed in the United States patent to Joseph J. Neff for Electrical Caliper, No. 2,364,237, dated December 5, 1944, and comprises a coil form 7 carrying a driving coil 8 and a pickup coil 9 on one side and a pickup coil 10 on the other side of the driving coil, the three coils having their windings coaxially arranged. An armature 11 is mounted centrally in the coils for movement longitudinally therein. The coil form may be mounted within a cylindrical housing 12 into which a screw plug 13 is longitudinally adjustably fitted and maintained in adjusted position by a set screw 14. Rigid with armature 11 is a stylus rod 15 having a cross pin 16 engaged by the lower end of a compression coil spring 17 whose other end bears against a wall 18 of housing 12 to normally force the stylus plunger rod 15 downwardly into the extended position shown

2 in Figure 2. In order to prevent inadvertent turning of the stylus plunger 15 about its own axis in work engaging operation it may be provided with a key 19 to ride in a longitudinal slot 20 in plug 13.

The bracket for supporting the displacement pickup unit on standard 3 may comprise a split collar 21 with a forwardly extending arm 22 terminating in a solid forward sleeve 23 in which the pickup unit is removably mounted to be conveniently positioned above the work supporting table 2. Rotation of wheel 6 effects rotation of the screw threaded bolt 4 which through its screw threaded engagement with arm 22 of the bracket provides for vertical adjustment of the bracket and the pickup unit with respect to table 2. A thumb bolt 24 extending through the ears of the split collar 21 effects a clamping of the bracket in any desired adjusted position. Conveniently mounted on pickup housing 12 is an electronic gauge housing 25 with a scale 26 and pointer 27.

Figure 1 shows the assembly in adjusted position with the work 28 supported on table 2 and engaged by the stylus 15. The work to be done in the illustration is the measurement of the outside diameter of specimen 28, or in the alternative, a comparative measurement of such outside diameter with that of a given standard work piece. Accordingly, the displacement pickup is so adjusted with respect to measurement of a standard work piece that the armature is positioned in its absolute electrical position with respect to the three coils. The voltages in the two pickup coils are in opposition as a result of coil connections so as to neutralize the effect of the pickup mechanism on the voltmeter 30, resulting in a zero reading of pointer 27 on scale 26 of the gauge 25.

Measurement by the instrument is dependent upon the position of the armature within the three coils. When the driving coil receives a signal from the vacuum tube oscillator 29, opposing voltages are set up in the two pickup coils. If by the surface engagement of the plunger stylus with the outer surface of specimen 28 as it rests on table 2, the stylus is caused to be moved from its preset position the armature is accordingly displaced from its electrical center with respect to the coils. More voltage will accordingly be induced in one pickup coil than in the other, resulting in a corresponding reading by movement of pointer 27 on scale 26 of the electronic gauge.

I claim:

1. In an electrical measuring instrument for measuring the outside boundaries of specimens, a specimen supporting table and a standard having a bracket slidably mounted thereon, manually adjustable means for adjusting said bracket toward and away from said specimen supporting table, an electrical displacement pickup mechanism mounted in a housing mounted in said bracket and comprising a driving coil and a pickup coil mounted on one side and another pickup coil mounted on the other side of said driving coil, the windings of said three coils being coaxially arranged, an armature mounted centrally within said coils for longitudinal movement therein, a stylus carried said armature in longitudinal alignment therewith, said armature and stylus being mounted for longitudinal straight reciprocal movement and spring means for normally forcing said stylus into a position wherein the armature is in an electrical central position within the coils, a bushing and means for longitudinally adjustably supporting the same in said housing for adjustably supporting said stylus and armature relatively with respect to said coils, means carried by said stylus, and cooperating with said bushing, for preventing rotation of said stylus upon its own longitudinal axis, an electronic gauge having its housing carried by that of said pickup mechanism and including means responsive to any movement of said stylus in its engagement with said specimen resulting in a displacement of said armature from said electrical center in said coils to give a corresponding visual reading of measurement of said specimen.

2. In an electrical measuring instrument for measuring the outside boundaries of specimens, a specimen supporting table and a standard having a bracket slidably mounted thereon, manually adjustable screw bolt means for adjusting said bracket toward and away from said specimen supporting table, an electrical displacement pickup mechanism mounted in a housing mounted in said bracket and comprising a driving coil and a pickup coil mounted on one side and another pickup coil mounted on the other side of said driving coil, the windings of said three coils being coaxially arranged, an armature mounted centrally within said coils for longitudinal movement therein, a stylus carried by said armature in longitudinal alignment therewith, said armature and stylus being mounted for longitudinal straight reciprocal movement and spring means for normally forcing said stylus into a position wherein the armature is in an electrical central position within the coils, a bushing and means for longitudinally adjustably supporting the same in said housing for adjustably supporting said stylus and armature relatively with respect to said coils, means carried by said stylus, and cooperating with said bushing, for preventing rotation of said stylus upon its own longitudinal axis, an electronic gauge having its housing carried by that of said pickup mechanism and including a scale, a pointer, a vacuum tube oscillator and electronic voltmeter, said voltmeter and pointer being responsive to any movement of said stylus in its engagement with said specimen resulting in a displacement of said armature from said electrical center in said coils to give a corresponding visual reading of measurement of said specimen.

JOSEPH J. NEFF.

REFERENCES CITED

The following references are of record in the file of this patent:

UNITED STATES PATENTS

| Number | Name | Date |
| --- | --- | --- |
| 1,835,807 | Parker | Dec. 8, 1931 |
| 2,016,978 | Thomas | Oct. 8, 1935 |
| 2,065,951 | Terry | Dec. 29, 1936 |
| 2,177,399 | Aller | Oct. 24, 1939 |
| 2,240,184 | Hathaway | Apr. 29, 1941 |
| 2,350,862 | Ayers | June 6, 1944 |
| 2,361,788 | Neff | Oct. 31, 1944 |
| 2,364,237 | Neff | Dec. 5, 1944 |
| 2,365,592 | Reason | Dec. 19, 1944 |
| 2,365,593 | Rights et al. | Dec. 19, 1944 |